(12) United States Patent
Baerts

(10) Patent No.: US 6,668,544 B1
(45) Date of Patent: Dec. 30, 2003

(54) METHODS FOR MONITORING THE CATALYTIC ACTIVITY OF A CATALYTIC CONVERTER

(75) Inventor: Christiaan Baerts, Beringen-Paal (BE)

(73) Assignee: Epiq Sensor-Nite N.V., Leuven (BE)

( * ) Notice: Subject to any disclaimer, the term of this patent is extended or adjusted under 35 U.S.C. 154(b) by 0 days.

(21) Appl. No.: 09/715,647

(22) Filed: Nov. 17, 2000

(30) Foreign Application Priority Data

Nov. 19, 1999 (DE) .......................................... 199 55 947

(51) Int. Cl.[7] ................................................. F01N 3/00
(52) U.S. Cl. ............................... 60/277; 60/274; 60/284
(58) Field of Search .......................... 60/274, 277, 284; 422/105, 108; 423/213.2, 213.5, DIG. 5; 436/37; 502/207, 346

(56) References Cited

U.S. PATENT DOCUMENTS

| | | | |
|---|---|---|---|
| 4,237,030 A | * 12/1980 | Noguchi et al. | ............ 502/207 |
| 5,834,395 A | * 11/1998 | Honda | ........................ 502/346 |
| 6,235,254 B1 | * 5/2001 | Murphy et al. | ................ 60/274 |

FOREIGN PATENT DOCUMENTS

| | | |
|---|---|---|
| DE | 40 27 207 A1 | 3/1992 |
| WO | WO 93/20340 | 10/1993 |

OTHER PUBLICATIONS

Table of Boiling Point of Water at Various Altitudes and Pressures.*

* cited by examiner

Primary Examiner—Thomas Denion
Assistant Examiner—Tu M. Nguyen
(74) Attorney, Agent, or Firm—Akin Gump Strauss Hauer & Feld, L.L.P.

(57) ABSTRACT

Two methods are provided for monitoring the catalytic activity of a catalytic converter arranged in the exhaust gas conduit of a motor vehicle. According to one method, proceeding from a cold start, a temperature progression is determined by a temperature sensor arranged downstream of the catalytic converter and a temperature plateau is thereby determined; the length of the temperature plateau is compared with the length of a temperature plateau determined in advance on a new catalytic converter; a shortening of the length of the measured temperature plateau is interpreted as an aging of the catalytic converter; and the catalytic converter is judged as defective if the shortening exceeds an established limiting value. According to a second method, two temperature sensors are used, one upstream and one downstream of the catalytic converter, with temperature progressions being recorded at both, and temperature differences between the first and second temperature sensors are determined at the beginning and at the end of a temperature plateau established by the second temperature sensor. The differences are offset against each other, and the offset value is compared with a reference value from a new catalytic converter.

1 Claim, 3 Drawing Sheets

METHODS FOR MONITORING THE CATALYTIC ACTIVITY OF A CATALYTIC CONVERTER

BACKGROUND OF THE INVENTION

The invention relates to methods for monitoring the catalytic activity of a catalytic converter arranged in the exhaust gas conduit of a motor vehicle, using a temperature sensor arranged in, on or downstream of the catalytic converter, or using a first temperature sensor arranged upstream of the catalytic converter and a second temperature sensor arranged in, on or downstream of the catalytic converter.

Procedures are known for monitoring the catalytic activity of a catalytic converter in a motor vehicle with the aid of temperature sensors. Thus, German published patent application OS 40 27 207 A1 describes such a method with at least two temperature sensors allocated to the catalytic converter. From the signals of the temperature sensors, a measured temperature value is formed, which is reduced to a proposition independent of the respective operating conditions either by compiling a mean value and while incorporating a plurality of operating conditions or while incorporating further measured values, and is compared with a predetermined limiting value. If the measured temperature value is less than the limiting value, the catalytic converter is reported as defective.

International application publication WO 93/20340 also describes a method for assessing the operability of a catalytic converter, which is operated in the exhaust gas duct of an internal combustion engine. The internal combustion engine is here operated proceeding from a state in which the catalytic converter temperature lies below the initiation temperature of a new catalytic converter and determines at which temperature the catalytic converter begins to convert. The established initiation temperature is compared with a reference temperature, which lies above the initiation temperature of a new catalytic converter and assesses the catalytic converter as operable if the established initiation temperature lies below the reference temperature. In a second method the time interval is determined, which the catalytic converter requires to reach the reference temperature, and this time interval is compared with a reference time interval. If the measured time interval is shorter than the reference time interval, the catalytic converter is once again judged as operable.

The problem now arises of making available a further method for monitoring the catalytic activity of a catalytic converter, which is arranged in the exhaust gas conduit of a motor vehicle.

SUMMARY OF THE INVENTION

The problem is solved in a first method wherein, proceeding from a cold start, a temperature progression is recorded from the temperature sensor, and a temperature plateau is thereby determined; the length of the temperature plateau is compared with the length of a temperature plateau determined in advance on a new catalytic converter; a shortening of the length of the measured temperature plateau relative to the length of the temperature plateau determined in advance is interpreted as an aging of the catalyst; and the catalytic converter is judged to be defective if the shortening exceeds an established limiting value.

The problem is solved in a second method wherein, proceeding from a cold start, respectively a temperature progression is recorded with the first temperature sensor and a temperature progression is recorded with the second temperature sensor; a temperature plateau is thereby determined from the second temperature sensor; at the beginning and at the end of the temperature plateau, respectively, a difference is calculated between the temperature at the first temperature sensor and the temperature at the second temperature sensor; the two difference values are offset against each other and the offset value is compared with a reference value determined in advance on a new catalyst; deviations from the reference value are interpreted as an aging of the catalyst; and the catalytic converter is judged to be defective if the deviation exceeds an established limiting value.

By "cold start" is here understood any condition in which the exhaust gas conduit of the motor vehicle moves in the range of the ambient temperature and does not exceed about +50° C.

Both methods use the knowledge that a catalytic converter for exhaust gas purification or nitrogen oxide reduction has a characteristic temperature rise after a cold start, which is accompanied by a plateau in which the temperature does not change for a short time. The plateau characterizes a certain temperature value appearing in narrow limits again and again over a more or less perceptibly long time period at the same level, which is dependent on the dew point of the exhaust gas flowing through the catalytic converter. The temperature value of the plateau is accordingly an almost constant magnitude.

However, there is otherwise a relationship with the length of the plateau and consequently the temperature difference between exhaust gas and plateau at the beginning and, above all, at the end of the plateau. It was determined that the length of the plateau depends upon the amount of water which must be evaporated on the internal, specific surface of the catalytic converter following a cold start. The specific surface itself represents a measure for the catalytic activity of the catalytic converter. However, the amount of water, which must be evaporated, is proportional to this specific surface. The length of the plateau consequently represents a measure for the catalytic activity of the catalytic converter.

The determination of the plateau of a new catalyst, required for comparison purposes, must take place separately according to the type of catalytic converter and the arrangement of the temperature sensor in the exhaust gas conduit, and can be established with the aid of a separate testing arrangement, or even upon the cold starts of a new motor vehicle. The determination is simpler the larger the mass of the catalytic converter to be heated and the larger the internal specific surface of the catalytic converter upstream of the temperature sensor in, on or downstream of the catalytic converter is, since the reference length of the plateau results from this. The determined reference length of the plateau, which for measurement corresponds to a time interval, can be stored in a software in the motor vehicle, which must also be in a position to determine the time interval when the rising temperature progression of the catalytic converter is in a plateau.

According to the first method, the currently measured length of the plateau or the time interval, respectively, can thus be compared with the stored value for the reference length of the plateau or for the reference time, interval, respectively, and if a previously established limiting value is exceeded, the catalytic converter is judged as defective.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
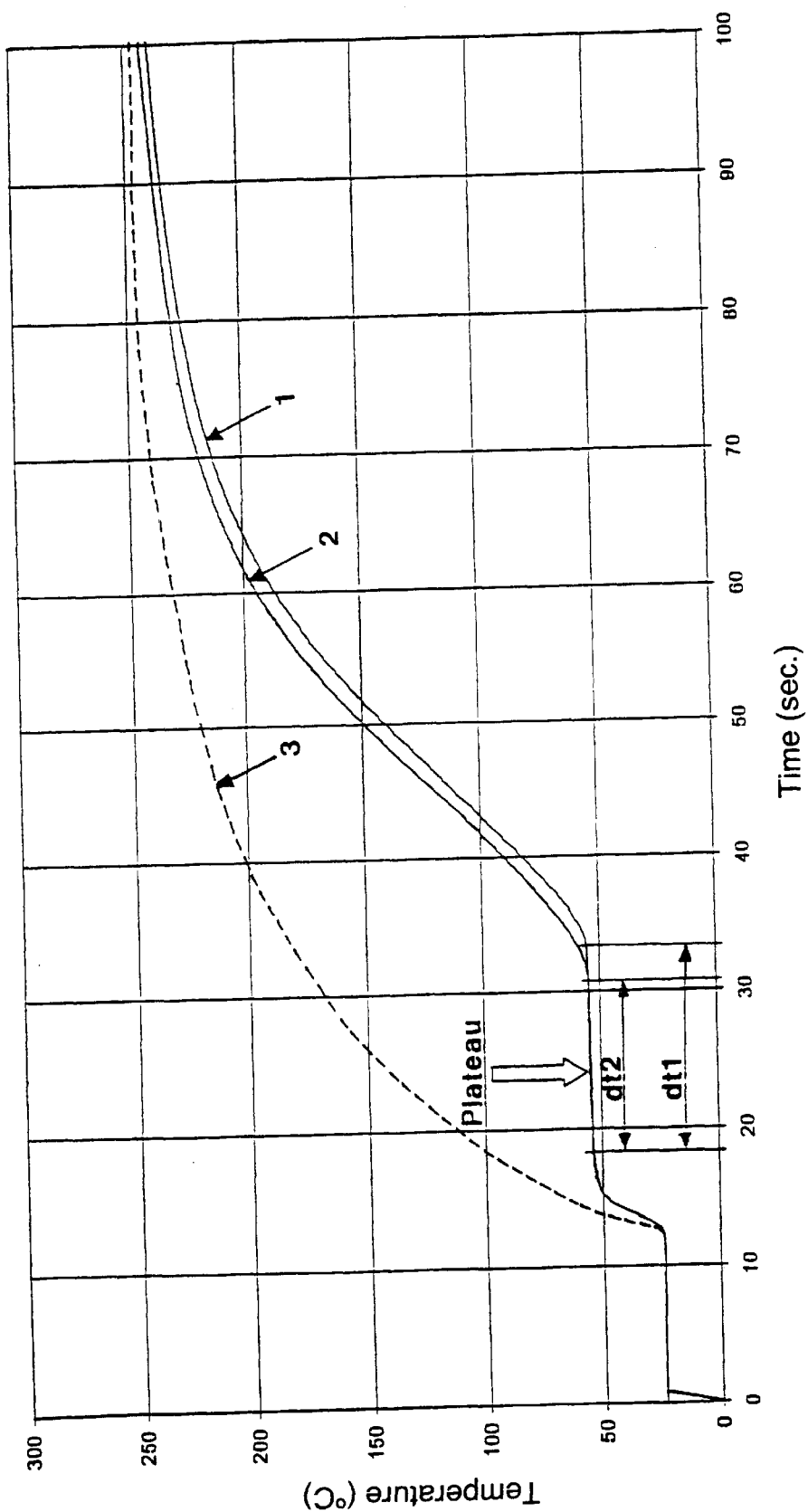
FIG. 1 is a graphical representation of the evaluation of plateau data according to the method of the first embodiment of the invention.

FIG. 1 shows the temperature progression curve 1 measured with a temperature sensor downstream of a new catalytic converter and the temperature progression curve 2 measured downstream of an aged catalytic converter. Curve 3 shows the actual progression of the exhaust gas temperature, which here, however, does not need to be measured and only serves for a better overview. A plateau appears for curve 1 with the length or time interval, respectively, dt1 and for curve 2, a shorter plateau of the length dt2. By way of example, a difference from dt1 and dt2 can now be compared with a limiting value to be established in advance, and it can now be judged whether the catalytic converter is still capable of functioning or not. This assessment can take place using an electronic unit in which the values of catalytic activity, determined for the type of catalytic converter used, in relation to the length of the plateau must be stored.

Figure 2:
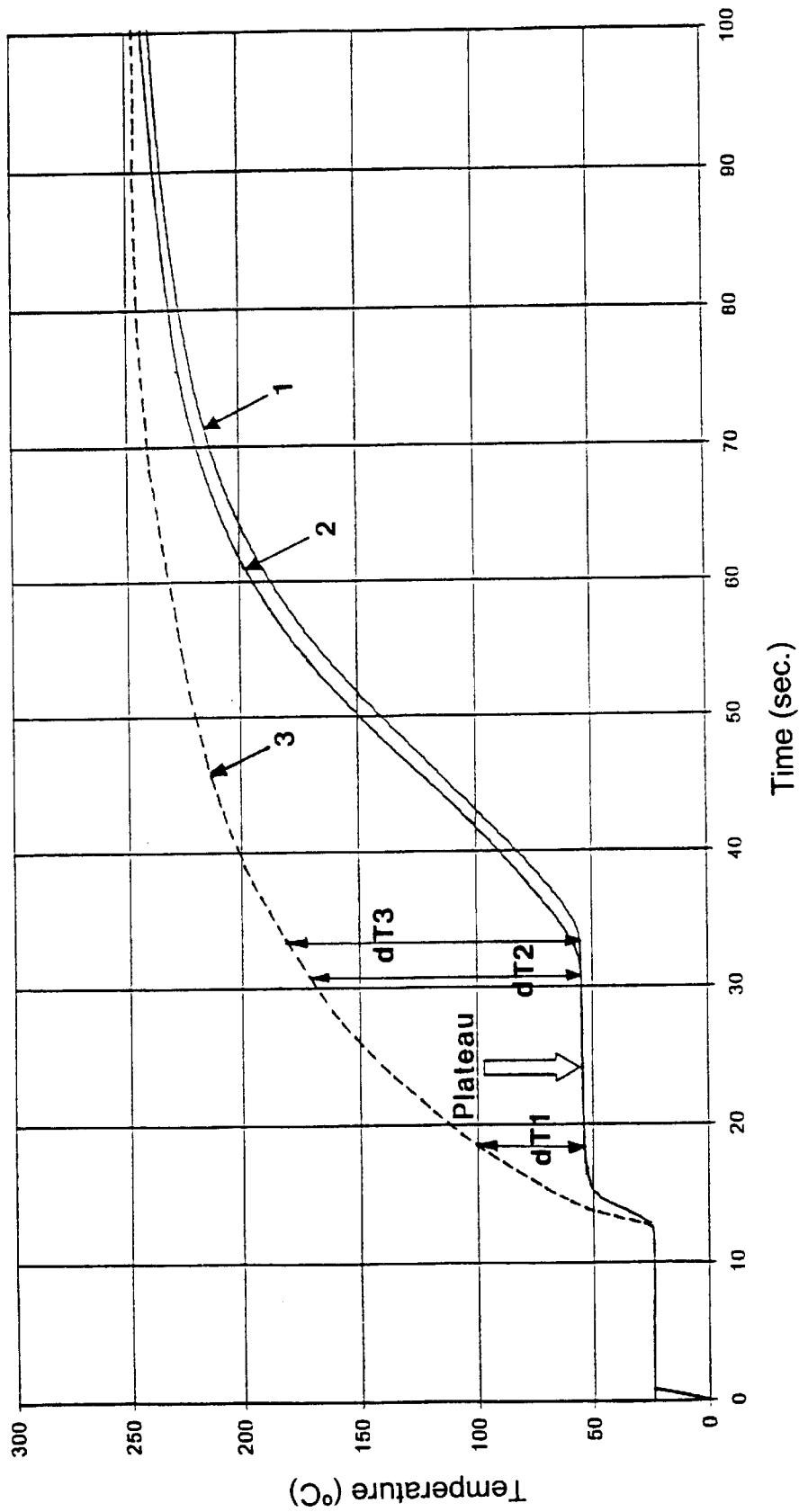
FIG. 2 is a graphical representation of the evaluation of plateau data according to the method of the second embodiment of the invention.

FIG. 2 shows the temperature curve 1 measured with a temperature sensor downstream of a new catalytic converter and the temperature curve 2 measured downstream of an aged catalytic converter. Curve 3 shows the actual progression of the exhaust gas temperature, which was measured here upstream of the catalytic converter. A plateau of specified length appears for curve 1 and a plateau of comparatively shorter length appears for curve 2. A temperature difference A can now be determined from dT1 and dT2, as well as a temperature difference B from dT1 and dT3, and A can be offset with B, for example by difference formation. In the present example dT1, that is the beginning of the plateau, is situated at the same spot for both curves. Consequently, in this case, it is possible to calculate the difference from dT2 and dT3 even more simply. The offset value is now compared with a limiting value to be established in advance, and it is assessed whether the catalytic converter is still operable or not. This assessment can take place using an electronic unit in which the values of catalytic activity, determined for the type of catalytic converter used, in relation to the offset value must be stored.

Figure 3:
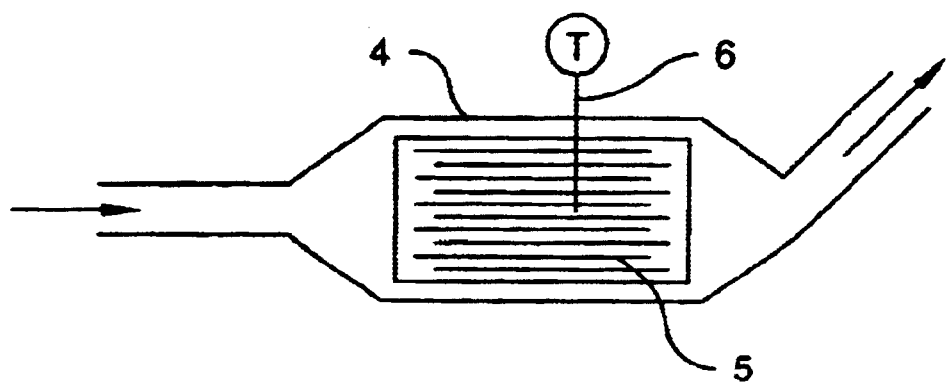
FIG. 3 is a schematic representation of a catalytic converter and temperature sensor arranged in an exhaust gas conduit for carrying out the method according to the first embodiment of the invention.
Figure 4:
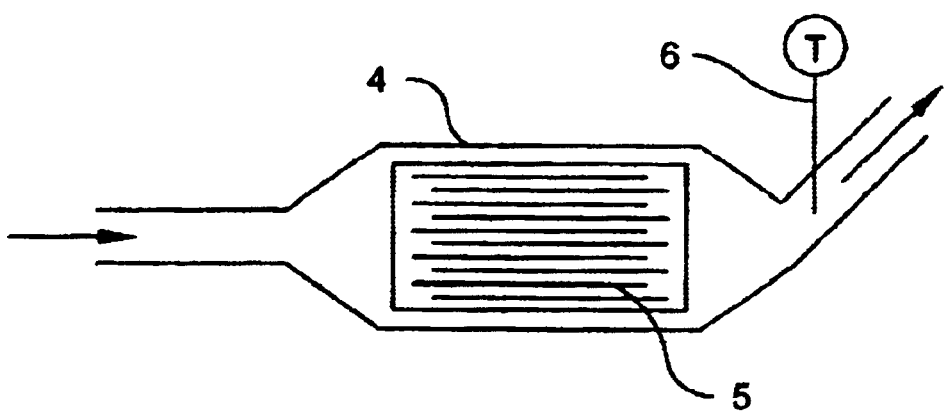
FIG. 4 is a schematic representation similar to FIG. 3, but with the temperature sensor arranged in a different location.

FIG. 3 shows an arrangement of a temperature sensor and catalytic converter in an exhaust gas conduit of a motor vehicle for monitoring the catalytic activity of a catalytic converter according to the first embodiment of the invention. This figure illustrates an exhaust gas conduit 4 having a catalytic converter 5 arranged therein and a temperature sensor 6 arranged in or on the converter. The arrows indicate the flow direction of the exhaust gas through the conduit. Similarly, FIG. 4 shows an alternate arrangement of the exhaust gas conduit 4, wherein the temperature sensor 6' is arranged downstream (behind) the catalytic converter 5.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for monitoring catalytic activity of a catalytic converter arranged in an exhaust gas conduit of a motor vehicle using a temperature sensor arranged in, on or downstream of the catalytic converter, comprising recording a temperature progression by the temperature sensor proceeding from a cold start and thereby determining a measured temperature plateau, comparing a length of the measured temperature plateau with a length of a temperature plateau determined in advance on a new catalytic converter, interpreting a shortening of the length of the measured temperature plateau relative to the length of the temperature plateau determined in advance as an aging of the catalytic converter, and judging the catalytic converter as defective if the shortening exceeds an established limiting value.

* * * * *